(12) United States Patent
Shuster

(10) Patent No.: US 8,593,565 B2
(45) Date of Patent: Nov. 26, 2013

(54) SIMULATED LARGE APERTURE LENS

(76) Inventor: Gary S. Shuster, Fresno, CA (US)

( * ) Notice: Subject to any disclaimer, the term of this patent is extended or adjusted under 35 U.S.C. 154(b) by 24 days.

(21) Appl. No.: 13/430,630

(22) Filed: Mar. 26, 2012

(65) Prior Publication Data
US 2012/0242867 A1  Sep. 27, 2012

Related U.S. Application Data

(60) Provisional application No. 61/467,829, filed on Mar. 25, 2011.

(51) Int. Cl.
G03B 7/00 (2006.01)
H04N 5/235 (2006.01)

(52) U.S. Cl.
USPC .......................................... 348/362; 348/348

(58) Field of Classification Search
USPC ...................... 348/222.1, 349, 362
See application file for complete search history.

(56) References Cited

U.S. PATENT DOCUMENTS

| | | | |
|---|---|---|---|
| 4,279,484 A | 7/1981 | Kimura | |
| 4,341,466 A | 7/1982 | Dyregrov | |
| 4,661,986 A | 4/1987 | Adelson | |
| 4,731,864 A | 3/1988 | Modla | |
| 5,193,124 A | 3/1993 | Subbarao | |
| 5,448,322 A | 9/1995 | Bacs, Jr. | |
| 6,229,913 B1 | 5/2001 | Nayar et al. | |
| 6,807,295 B1 | 10/2004 | Ono | |
| 7,006,132 B2 | 2/2006 | Pereira et al. | |
| 7,379,584 B2 | 5/2008 | Rubbert et al. | |
| 7,433,589 B2 | 10/2008 | Odaka | |
| 7,557,824 B2 | 7/2009 | Hollinan | |
| 2008/0101784 A1 | 5/2008 | Hsu | |
| 2009/0290041 A1* | 11/2009 | Tamaru | 348/222.1 |
| 2010/0128137 A1 | 5/2010 | Guidash | |
| 2010/0200752 A1* | 8/2010 | Lee et al. | 250/330 |
| 2010/0259670 A1* | 10/2010 | Mohan et al. | 348/349 |
| 2011/0001790 A1 | 1/2011 | Marin et al. | |
| 2011/0229052 A1* | 9/2011 | Li et al. | 382/264 |
| 2012/0162392 A1* | 6/2012 | Gharib et al. | 348/49 |
| 2012/0162410 A1* | 6/2012 | Vaillant | 348/135 |
| 2012/0249836 A1* | 10/2012 | Ali et al. | 348/239 |

OTHER PUBLICATIONS http_www.ephotozine.com_article_bokeh-lens-simulation-plug-in.

(Continued)

*Primary Examiner* — Gevell Selby
(74) *Attorney, Agent, or Firm* — Novak Druce Connolly Bove + Quigg LLP; Jonathan Jaech

(57) ABSTRACT

A camera apparatus includes a photogrammetric range sensor, small aperture lens and a processor configured to carry out a method for simulating a large aperture lens. The method includes capturing a photographic image data of a scene using the camera with the lens set to a small aperture size. Simultaneously or near-simultaneously with capturing the image, the camera captures photogrammetric range data pertaining to depth of objects in a field of view of the camera, using the range sensor. The processor then processes the photographic image data using the photogrammetric range data to obtain second photographic data simulating an image captured using a lens set to an aperture size larger than the small aperture size.

16 Claims, 4 Drawing Sheets

(56) References Cited

OTHER PUBLICATIONS

Image%20formation%20with%20a%20microlens-based%20optical—Image formation with a microlens-based optical detector: a three-dimensional mapping approach, Image formation with a microlens-based optical detector: a three-dimensional mapping approach.

Image-based 3D surface reconstruction by combination of photometric, geometric, and real-aperture methods—Pablo d'Angelo, Christian Wöhler—DaimlerChrysler Group Research, Machine Perception, P.O. Box 2360, D-89013 Ulm, Germany.

Multiple image encryption using a aperture-modulated optical system John Fredy Barrera a, Rodrigo Henao a, Myrian Tebaldi b,*, —Roberto Torroba b, Ne'stor Bolognini c, Science Direct; Nov. 25, 2005.

http://www.engadget.com/2011/07/19/samsung-camera-patent-application-adds-simulated-... Mar. 28, 2012; Samsung camera patent application adds simulated depth-of-field to point-and-clicks.

* cited by examiner

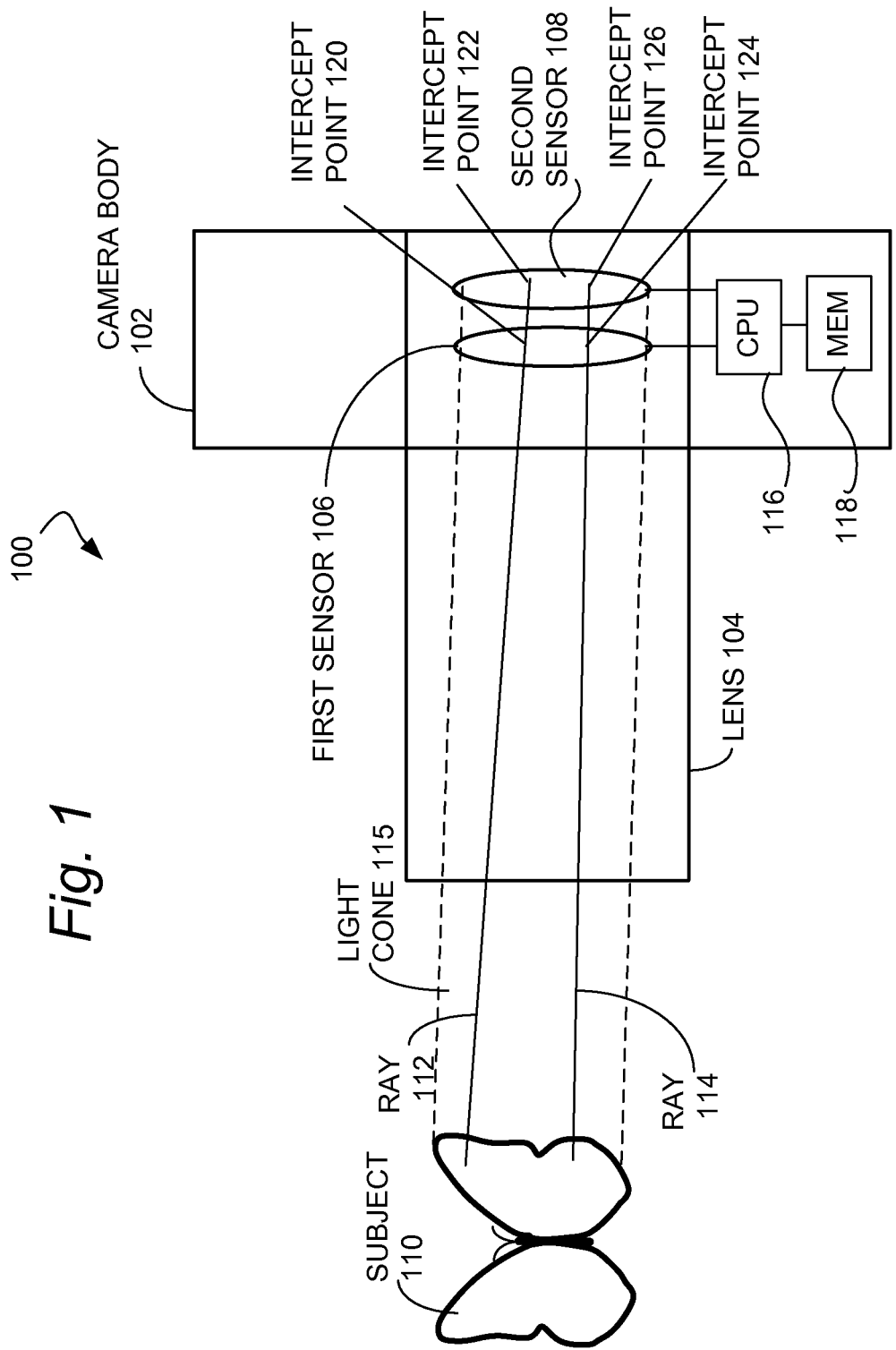

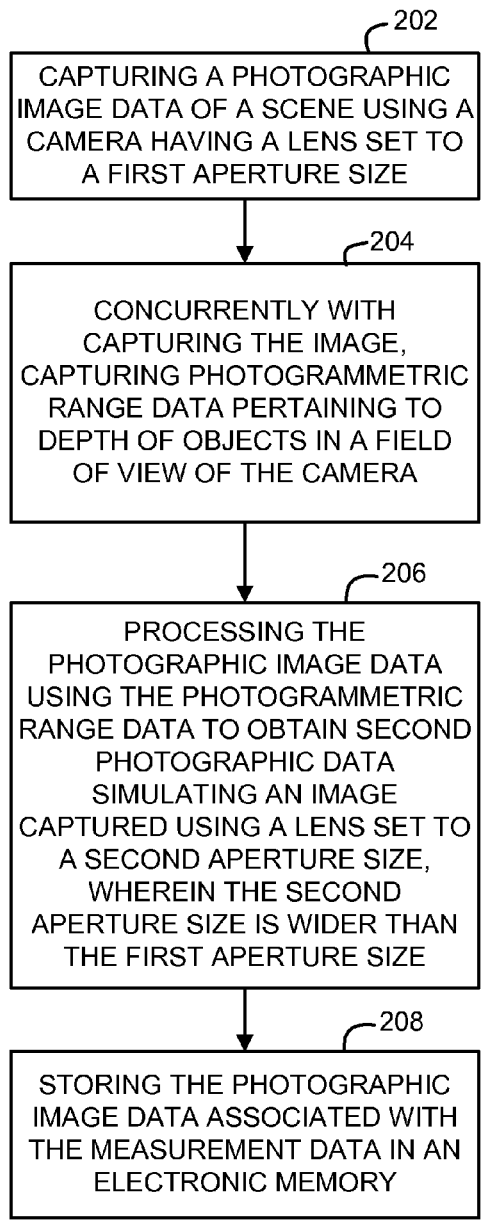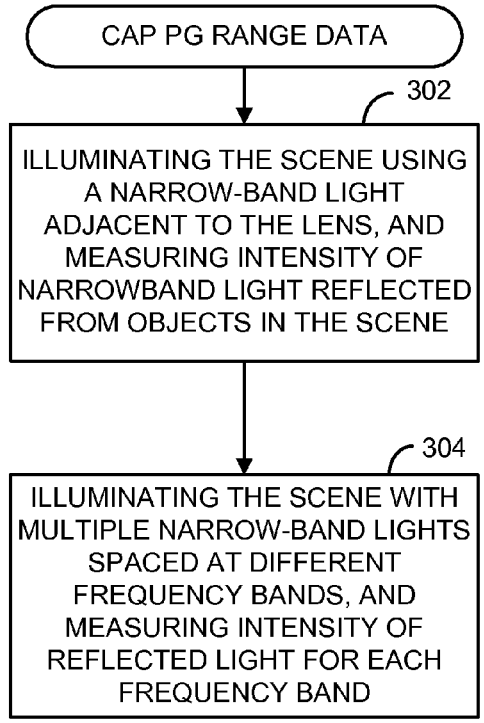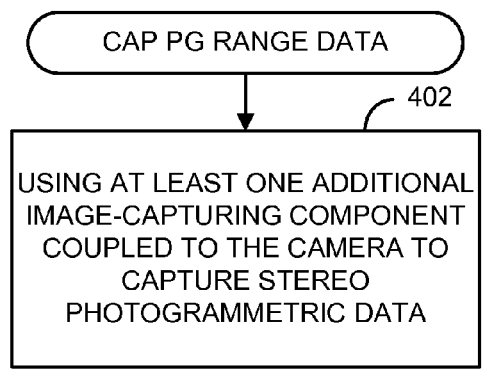

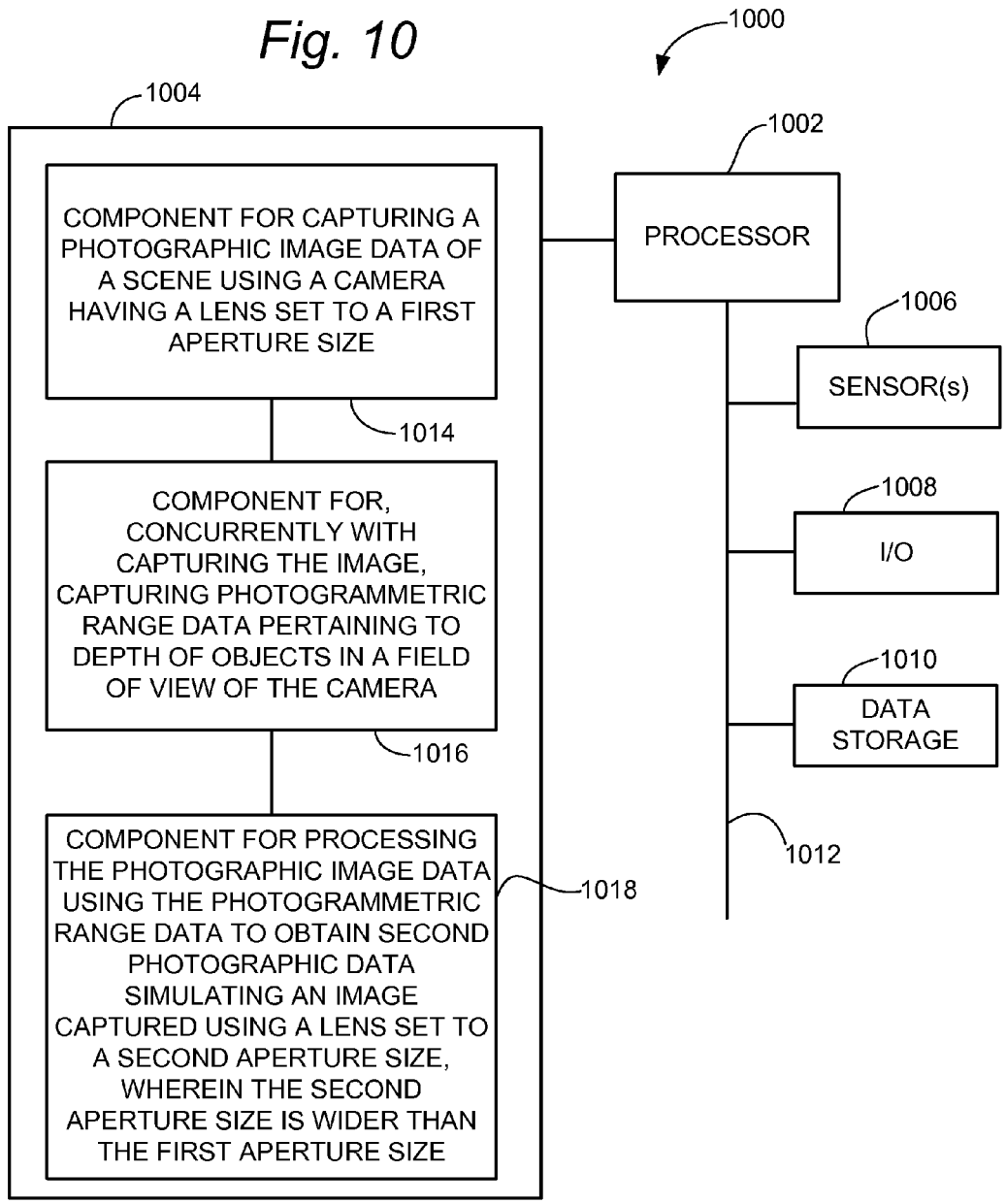

SIMULATED LARGE APERTURE LENS

CROSS-REFERENCE TO RELATED APPLICATION

This application claims priority pursuant to 35 U.S.C. §119 (e) to U.S. provisional application Ser. No. 61/467,829 filed Mar. 25, 2011, which is hereby incorporated by reference, in its entirety.

FIELD

The present application relates to optics, and more particularly to camera components and methods for simulating a large-aperture lens.

BACKGROUND

A well-defined focal plane resulting in blurring of background and/or foreground objects in photographs is one of the benefits of high quality, large aperture lenses. However, large apertures come with significant downsides. Such lenses are more expensive and difficult to manufacture; are heavier and larger than comparable smaller aperture lenses, and can dramatically magnify the impact of even minor errors in focus. For example, using an expensive 85 mm F/1.2 lens, open to its full aperture, a photographer may find the depth of field so narrow that if the focus is on the tip of the subject's nose, the eyes may be out of focus. Similarly, wildlife and sports photography are areas where a narrow depth of field delivers striking images of the player or animal isolated from its surroundings, but even a small amount of motion by the subject after focus has been set can result in the desired area moving out of the area of sharp focus.

Modern digital cameras are capable of delivering low-noise images at relatively high ISO, or light sensitivity, settings. Compared to film, or earlier digital sensors, modern sensors are many times more light-sensitive—and light sensitivity in sensors is increasing significantly each year. Combined with modern post-processing software and techniques, one of the biggest benefits of large aperture lenses (note that "large aperture" literally refers to the size of the aperture; apertures are actually numbered in reverse, so that the largest apertures have the lowest numbers, for example 1.2 is much larger than 8.0) is the ability to deliver a lot of light to the imaging surface, allowing adequate light to be delivered even in low light conditions. With each advance in sensor light sensitivity and noise reduction, the utility and value of this quality of large aperture lenses is reduced. Indeed, an F/4.0 lens mounted on a modern digital DSLR can now deliver quality photographs in light conditions that may have required an F/2.8 lens just a few years ago.

As lens aperture is reduced (i.e. as the F/number increases), the depth of field increases. A "pinhole" aperture delivers a functionally infinite depth of field. While the photons can literally interfere with each when the aperture becomes too small, cameras/lens combinations typically deliver high quality photographs with enormous depth of field at small lens apertures, such as f/11 or f/22. Such photographs, however, can appear unnatural and flat, as objects both near and far are rendered with comparably sharp focus. It would be desirable, therefore, to overcome these and other limitations of the prior art with a new camera system and method.

SUMMARY

Methods, apparatus and systems for simulating a large aperture lens are described in detail in the detailed description, and certain aspects are summarized below. This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

A camera configured to include an image processor and a photogrammetry device for sensing depth of field may perform a method for simulating a large aperture lens. The camera may comprise a dedicated device, or a camera function in a more general-purpose electronic device, for example a smart phone or notepad computer. The method may include capturing a photographic image data of a scene using the camera having a lens set to a first aperture size. The method may further include simultaneously or near-simultaneously with capturing the image, capturing photogrammetric range data pertaining to depth of objects in a field of view of the camera. The method may further include processing the photographic image data using the photogrammetric range data to obtain second photographic data simulating an image captured using a lens set to a second aperture size, wherein the second aperture size is wider than the first aperture size. The method may further include storing the photographic image data associated with the measurement data in an electronic memory.

In an aspect, capturing the photogrammetric range data may further include illuminating the scene using a narrow-band light adjacent to the lens, and measuring intensity of narrowband light reflected from objects in the scene. For example, the method may further include illuminating the scene with multiple narrow-band lights spaced at different frequency bands, and measuring intensity of reflected light for each frequency band.

In another aspect, capturing the photogrammetric range data further comprises using at least one additional image-capturing component coupled to the camera to capture stereo photogrammetric data. In the alternative, or in addition, capturing the photogrammetric range data further comprises measuring time between emission of a signal from the camera and detection of a signal reflection at the camera. Various other ways may also be used for capturing the photogrammetric range data. For example, capturing the photogrammetric data may include capturing additional photographs using an aperture wider than the first aperture and different focal points. For further example, capturing the photogrammetric range data may include illuminating the scene using a light source that spreads a known spectrum in a defined pattern. Capturing the photogrammetric range data may further include using a dual shutter trigger to capture separate photographs, or using the lens in combination with a sensor array configured to detect photogrammetric measurement light at two or more defined points in a light path from photographed object to an image sensor of the camera.

In related aspects, a digital camera with optical elements and processing elements may be provided for performing any of the methods and aspects of the methods summarized above. An camera may include, for example, a camera body supporting a lens and a range finding sensor coupled to a processor and a memory, wherein the memory holds instructions for execution by the processor to cause the camera apparatus to perform operations as described above. An article of manufacture may be provided, including a non-transitory computer-readable medium holding encoded instructions, which when executed by a processor, may cause a camera apparatus to perform the methods and aspects of the methods as summarized above.

Further embodiments, aspects and details of methods, apparatus and systems for simulating a large aperture lens are presented in the detailed description that follows.

BRIEF DESCRIPTION OF THE DRAWINGS

The present technology, in accordance with one or more various embodiments, is described in detail with reference to the following figures. The drawings are provided for purposes of illustration only and merely depict typical or example embodiments of the technology. These drawings are provided to facilitate the reader's understanding of the technology and shall not be considered limiting of the breadth, scope, or applicability of the technology.

FIG. 1 is a block diagram showing an example of a system for simulating a large aperture lens.

FIG. 2 is a flow chart illustrating a method for simulating a large aperture lens.

FIGS. 3-9 are flow charts illustrating various additional aspects of capturing photogrammetric range data for simulating a large aperture lens.

FIG. 10 is a block diagram illustrating an example of an apparatus for simulating a large aperture lens.

DETAILED DESCRIPTION

Figure 5:
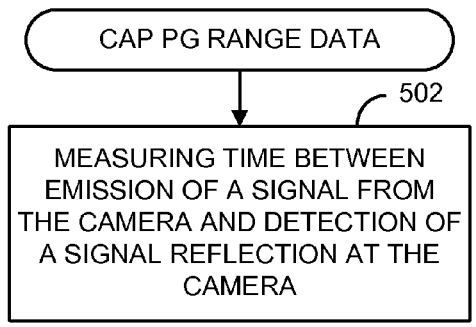

The present technology takes advantage of the higher light sensitivity of modern sensors, reducing lens aperture size without simultaneously giving up the ability to deliver the narrow depth of field that makes large aperture photographs desirable. Additional benefits may include providing the ability to elect the depth of field and the type and intensity of blurring for objects that are in the area that would be out of focus with a wider aperture. The present technology enables a camera operator to make such an election after the photograph has been taken. In addition, the present technology may enable simulated aperture changes, for use with lenses designed with a fixed aperture. Fixed aperture lenses may provide reduced cost and reduced risk of breaking.

Various methods may be used to encode distance from the camera to the various objects in the field of view. Once the distance information is determined, it may be stored with the recorded image, such as within the photo file or in an associated auxiliary file. In certain implementations, the distance information may be embedded within the photograph light and/or color data itself. The distance information may additionally or alternatively be used to alter the depth of field during the in-camera post-processing. Multiple variants may be produced (in-camera or during later processing) using varieties of combinations of simulated apertures and focus points. To maximize the benefits of this technology while obtaining a desired shutter speed, algorithms may be included that shut down the physical aperture to the smallest size possible while delivering the target shutter speed.

In an embodiment, as the light requirements of the sensor decrease, it is possible to utilize a lens with the focal characteristics of a pinhole camera, allowing an infinite depth of field. Another embodiment may use an autofocus point generally within the range of where the camera would normally determine autofocus to best focus on. Another variant identifies a plurality of likely desirable focal points and selects an aperture that renders all of those focal points with clarity. Use of a pinhole type lens eliminates the need to account for extant lack of focus in adding the blur required to simulate a wider aperture or different focus point; without such a pinhole lens, the software may need to account for extant blur in adding new blur. In another implementation, the camera "brackets" the focus on more than one exposure in a manner that delivers an in-focus image throughout the entire scene, spread of multiple images. Such images are then utilized in concert in creating the simulated focus point and aperture.

The type of aperture (number of blades, for example) dramatically impacts the quality of the "bokeh", or out-of-focus blur effect. The simulated aperture is advantageously selected to complement the existing bokeh in a non-pinhole, non-infinite focuses photograph, so that multiple bokeh types do not co-exist. In an embodiment, the user is allowed to select the simulated aperture type, and/or the camera or post-processing software selects the simulated aperture type based upon a rule set. In another implementation, the camera or post-processing software selects a simulated aperture type and/or size and/or other characteristics to match a real world lens other than the lens actually used—for example, making an inexpensive F/8.0 fixed aperture lens render photographs that emulate those taken with a Canon F/2.8 70-200L II lens. In an embodiment, the camera and/or post-processing software contain a database of which lenses are capable of rendering images that can emulate which other lenses (e.g., "lens 'A' can emulate the following 24 lenses" (list)).

To facilitate measuring range data, a specific range of light, for example ultraviolet, infrared, or a very narrow band of the visible spectrum (for example 415-416 nm) may be used. It may be advantageous even with non-visible portions of the spectrum to use as narrow a band as possible, to prevent noise or interference. It may also be advantageous to have the camera or other sensor select one of a plurality of light frequencies based upon the relative absence of ambient light in the chosen frequency. It may also be advantageous to utilize a plurality of light frequencies so that the cleanest overall frequency, or the cleanest frequency for each of a plurality of areas in the image, can be used. The one or more light frequencies may be generated by a camera mounted device, such as a flash, but may also be generated off-camera, for example by an auxiliary flash unit. Because light intensity drops off with increasing distance from the light source, the intensity of the light reflected back at the camera is a primary indicator of distance from the camera. However, because light reflected off of certain surfaces is reflected more efficiently than from other surfaces, it may be advantageous to use additional indicia of distance. Using a plurality of separate light frequencies, or even utilizing radiation frequencies that are well outside of the visible spectrum, can be used to determine drop-off due to reflection differences. For example, an averaging mechanism may be utilized. In addition, the specific qualities of various portions of the radiation spectrum, such as the differences in the speed with which the radiation fall-off takes space at the long versus short end of the spectrum, can be used to determine which measured variations are due to distance, and which to differences in reflection.

In an embodiment, contrast data for the visible light within the normal imaging range of the camera is combined with contrast data for the light used to measure distance in order to determine the edges of objects. Objects within a framed area (such as a black and white striped shirt, which may be recognized as part of a single object despite the drop-off of light reflected from the black areas) can be treated as being at a similar distance. In addition, the light data from the sensor can be used to adjust the distance data gleaned from the measurement of the reflected radiation (for example, areas that are darker in the photograph may naturally reflect less light than lighter areas, and the distance data for those areas may need to be increased to account for the absorption the color difference would normally generate).

Where the radiation frequency used for the measuring guide light is within the spectrum visible to the camera, the post-processing mechanism advantageously removes any light in that frequency. Alternatively, a filter placed over the lens, within the lens, or over the sensor may be used to prevent that frequency from being visible, although a secondary sensor, or a series of photographs, at least one without the sensor, may be required in such a case. In any case where a portion of the visible spectrum is removed, an embodiment the camera apparatus may repopulate the missing portion of the spectrum by averaging the neighboring, unfiltered portions of the spectrum.

In an embodiment the camera apparatus may take photographs in sequence, where the light used to measure distance is released only for one of the plurality of photographs. Optionally, the "measuring photo" in the sequence may utilize a special filter over the sensor or within or over the lens.

In a simple example, a photographer might mount a fixed f/11 lens and take a photograph of a person in a field of flowers. The camera maymay trigger a flash (in some implementations, using a laser to obtain the precise frequency desired). The same or a different flash may project light used for other purposes, such as lighting up portions of the image for better imaging. The depth detection flash (whether integrated in a regular flash, embodied within one or more LEDs, generated with a diffused laser, or otherwise) may trigger during the exposure, releasing radiation at 380 nm and 720 nm. The selected light range must account for, and fall outside of, any filters between the scene and the sensors, and must also not fall outside of the sensor's range. The sensor may then record the light falling on various portions of the sensor. In an embodiment, care is taken to avoid chromic aberration or other prism-type optical imperfections that may cause light in the distance sensor range from landing on a different portion of the sensor than visible light reflected from the same object. To minimize the impact of such chromic aberration, and to permit more accurate correction of such errors in post-processing (even without utilizing the other features of these embodiments), the measurement signal may include extremely narrow band signals on a plurality of wavelengths within the sensor range, advantageously at least one each toward the large and small ends of the visible range, to allow use of the differential focus of the various known light components in the specific wavelength pulse to be interpolated for the various wavelengths and used to correct the optical errors.

The relative strength of the 380 nm and 720 nm light (from the example) over the various portions of the photograph are used to determine distance from the camera for the objects within the field. Objects that do not reflect one of the frequencies properly (i.e. an object that absorbs 380 nm radiation efficiently) are advantageously measured using the other frequency. Objects that absorb the plurality of frequencies (or objects that absorb the single frequency in the event of a system implemented using only one frequency) are examined digitally and, where contrast, light, and color indicate they are too distant to have reflected the light, they are marked as out of range and/or distant. Where the indications are that they are due to another factor, such as absorption, their distance is imputed based upon the distance of comparable objects, nearby objects, and contrast.

The technology is advantageously implemented utilizing a single light sensor, but may be implemented using a secondary sensor. In such a case, the secondary sensor is advantageously customized for the application, such as be being sensitive to the frequencies likely to be used and by having a low pass or other filter either absent, or configured to let in at least the frequencies likely to be used.

The use of light to measure distance is advantageously used in combination with the other mechanisms described herein, but need not be.

A second mechanism to obtain the necessary distance/depth information is to utilize at least one additional sensor to generate a three-dimensional image. The distance between the camera and the objects may be computed by using standardized mechanisms for measuring distance when binocular (or more than binocular) images are available.

An additional mechanism to obtain the necessary distance/depth information is to utilize the transmission of particles or waves in conjunction with measurement of their return reflection. In an embodiment, the sound of the shutter is used as the source of a sound, the reflection of which may be measured using a plurality of microphones to generate a 3D map of the field of view of the camera. A secondary sound source may also be used.

With sound, and even with light, it is also possible to measure the time taken from exposure to return and determine distance in this manner. The speed measurements may be used in addition to, or in place of, the intensity measurements described herein.

An additional mechanism to obtain the necessary distance/depth information is to take at least one, but advantageously a plurality, of photographs with a wider aperture and with different focal points. For example, the camera automatically, upon actuation, might set its aperture to F/4 and focus to infinity and take a photograph, to 10 feet and take a photograph, to as close as possible and take a photograph, and then set its aperture to F/22 and focus to 20 feet (at that aperture, creating a nearly infinite focus) and then take the photograph intended for use. In post-processing, other than objects moving in the frame between photographs (and the photographs can be taken in very rapid succession, since even fast, phase-based autofocus is unnecessary), the relative blur of the objects in the infinite, mid-range, and macro focus photographs can be used to determine their distance from the camera. The F/22 photograph may then be post-processed to emulate any focal point and aperture because full distance information is available.

In an embodiment, at least one secondary imaging device (such as a lens and sensor) is present on the camera and is used to generate at least one image utilized to reconstruct focus. In an embodiment, a secondary, small lens with a fixed wide aperture relative to sensor size is used, advantageously in conjunction with a light-splitting method (such as a semi-translucent mirror), to take one, or advantageously a plurality of, photographs simultaneously or nearly simultaneously with the primary imaging mechanism, where the placement of the secondary lens and/or sensor and/or configuration of the lens and/or sensor creates a known focal distance or depths. These may be implemented as a plurality of second imaging units, rather than a single light-splitting unit or sequentially focusing/firing unit. For example, a DSLR might have three additional F/4.0 lenses and sensors mounted on the body, each aimed at a 2 megapixel sensor, one set to infinity, one set to 2 feet, and one set to 15 feet for focus. Although the primary sensor may be 21 megapixels, the distance data sensors may generate a set of images that may be compared to the primary image and used to determine the corresponding objects, and therefore the corresponding distances, of those objects.

The distance information can also be used to dynamically increase the amount of gain, brightness, or raw-processing "exposure" for areas based on distance from a flash or other light source.

A brief description of some of the technology herein is the use of a flash, emitting in a known portion of the visible or non-visible spectrum, and measure the time for the light to return and/or the intensity of the return. Record the time or intensity for each pixel or for groups of pixels or areas, and then use that to generate distances. The post-processing software can then blur or sharpen or color or isolate based on distance.

An additional element is to utilize a light source that transmits on more than a single wavelength (though none are necessarily visible) but which releases the light in a known spread pattern. For example, a light source with a prism might emit light from 350 nm to 399 nm, but the prism, and in some implementations a focusing device, may deliver the light in a fixed pattern so that the light is spread in a predictable way across the field. Using a simple example of a light ranging from 381 to 390 nm, the top 10% of the flash might be 390 nm, the bottom 10% of the flash 381 nm, and the remainder spread, increasing between 382 to 389, over the other 80% of the field (although the top-to-bottom pattern may be left to right, for example, as well). Objects in the foreground may have a far larger range of light painting than objects in the background. In an embodiment, light painting may utilize a plurality of light sources, each broadcasting on a different set of frequencies and placed in different locations, in order to create what is effectively a 3D light painting over the objects in the field of view. A simple measurement based on the areas shaded from one light source but not the other may provide significant depth information even without using more than one light frequency per source. Use of varying frequencies from each of one or more sources may allow determination, in post-processing, as to where the object was relative to the camera and light source. For example, a camera pointed straight across a room, where a light source at the top of the room illuminates down, at a 45 degree angle, across a spectrum (say 399 nm at the ceiling, 390 on the floor), may capture information permitting a determination of whether an object was small, and close to the camera, or large and distant from the camera, depending on how much of a light frequency spread is present on the object.

In certain digital light sensors, a light-splitting mechanism, such as a prism, is used to direct certain light frequencies toward certain areas of the sensor, typically functioning in such a manner that one pixel receives red, another green, and another blue. The true color of each pixel is reconstructed from this data, for example by interpolating the color (for example, the amount of red and blue present in the pixel that has received only green light on the filter) based on neighboring pixels. One implementation may include filtering (or splitting via a light-splitting mechanism) all light hitting certain pixels except for the one or more frequencies used to recreate distance data. The same mechanisms utilized to reconstruct missing color data in the RGB light-split sensor design can be utilized to reconstruct the true color data for the measurement pixel locations.

Another mechanism is to utilize a dual shutter trigger, wherein the shutter triggers once for the actual photograph and then immediately before or after for a photograph measuring distance. Optionally, a low pass or other filter may be deployed for one or both exposures. In an embodiment, in cameras with a physical shutter (such as a mirror DSLR-style shutter), the initial photograph is taken first, and the shutter is digitally closed (or at least the data retrieved from the sensor), then the measurement light is triggered and a second exposure with the measurement light is utilized. Because the measurement light exposure utilizes a fixed, known source and quality of light (i.e. a flash sending light at a set frequency or frequencies), the second exposure need not match the speed (or aperture) of the first exposure. Advantages in correlating the two images may exist if the sensor is read, but not discharged, between exposures so that the first data set is the sensor's normal exposure, and the second is the normal exposure plus the measurement light exposure. Advantageously the second exposure is very short. In an embodiment, the strongest measurement light source available that does not cause potential harm to vision or other harm is utilized in order to keep the additional exposure time in the hundredths or thousandths of a second. In an embodiment, when a flash is used to illuminate the visible light for the primary exposure, the measurement light is sent and measured first if the flash is set for "first curtain", and the measurement light is sent and measured second if the flash is set for "second curtain". A "first curtain" flash illuminates the scene at the beginning of an exposure period that lasts longer than the flash itself. A "second curtain" flash illuminates the scene at the end of an exposure that lasts longer than the flash itself. By measuring distance as closely in time to the firing of the flash, the distance data for moving objects will match those most visible in the photograph. Where the measurement signal is read before the primary exposure, it may be advantageous to discharge the data from the sensor prior to beginning the primary photograph.

In another embodiment, movement within a single frame may be measured by triggering a measurement signal before or at the beginning of an exposure and by triggering a second measurement signal (either with the sensor discharged between exposures, or by utilizing different wavelengths for each of the plurality of measurement signals). More than two measurement signals may be used, particularly for longer exposures. By comparing the distance data present at the start and end of the photograph, the movement of objects may be measured. In a variant, a plurality of photographs is taken (with or without measurement signals) and using standard mechanisms are used for identifying elements within photographs (in combination with distance measurement data in an embodiment). The measurement of the movement of objects is then utilized to reverse some of the motion blur, to improve or enhance the motion blur, or to select the blurred areas for other processing, either in an automated fashion or by exposing the selection to a user who may then further manipulate the area (or the non-motion areas) by utilizing Photoshop™ filters or similar techniques.

Using the multiple exposure technique just described to identify motion blurred areas, it is possible to correct motion blur caused by a handheld or other error causing the camera to move relative to the light source in a manner that causes a blur (such as by attempting to hand-hold a shot with too long an exposure time). The additional shots used for motion detection need not be properly exposed, may utilize non-visible portions of the light spectrum, and may utilize an artificial light source not present in the primary photograph. For example, a flash may trigger at 380 nm with substantial power; a very rapid shutter photograph may be taken, followed by a ⅒ of a second visible light exposure, followed by a very rapid shutter photograph using another trigger of the flash at 380 nm. Because the flash may not be visible to humans, even a very bright flash may not be disruptive, and may allow the position of objects immediately before and after the primary exposure to be measured. In this manner, moving objects and even overall blur caused by poor technique or too slow a shutter speed for a hand-held shot may be digitally reversed, identified, enhanced, or otherwise manipulated. In a variant, a long exposure with a brief visible light flash may be used in conjunction with a single flash (visible or otherwise) instead of triggering two measurement flashes (i.e. a first curtain flash replaces the first measurement flash, or a second curtain flash replaces the second measurement flash). The measurement flash may advantageously be in a non-visible spectrum area, but in the alternative, or in addition may also be visible. An underexposed photograph with ambient light, a weak flash from the primary flash used for the main exposure, or from another light source, may be used in place of one or more of the measurement exposures.

The amount of movement between exposures, advantageously in combination with recording the data regarding the length of the exposures and the time between exposures, may be used to determine speed of the object(s) being photographed.

Using a simple example of a tennis ball flying past a spectator, the pre-exposure and post-exposure measurement photographs may identify that the tennis ball is moving at 100 feet per second. If the primary exposure was 1/30th of a second but the photographer wants to enhance motion blur, the photographer may tell the system to predict the position the ball may have occupied at 1/15th of a second exposure, and the software may then lengthen the blur to reflect that new position. Alternatively, the photographer may wish to reduce the motion blur. The calculated position of the tennis ball at a 1/250th of a second exposure may be used to shorten the motion. Technology such as Adobe Photoshop's™ "context-aware fill" may be used to fill the area obscured by the now-eliminated blurred portion.

It should be noted that the use of distance data in conjunction with software that requires or benefits from selection of specified photographic elements allows for far more accurate selection. For example, it is widely acknowledged that selecting curly hair in a photograph is very difficult, as the hair overlies many different background elements. Using the distance data to select only elements within a few inches of the head should result in a selection of the hair, head and body only. The selection can then be modified in traditional ways. Similarly, a white bird sitting on a light post in front of white clouds may be nearly impossible to select or isolate in an automated manner, but use of distance information allows automated selection of the bird. Distance information may be used alone, in conjunction with traditional tools, in conjunction with manual selection, or in any combination thereof.

An additional implementation is to identify the drop off in flash illumination and use that drop off to identify distance information. Particularly where the white point of the flash differs from the white point of the ambient light, the light quality differential, advantageously measured against similar objects, can be used to determine distance.

Another method for generating distance data, whether for encoding such data for use in generating 3D images, for directing generating 3D images, or for manipulating focus point, assisting, enhancing, or accomplishing the selection of specified image elements, or otherwise, is to utilize a single lens in combination with a sensor capable of detecting light at two or more points in the light's path from object to filter. This may take the form of a stacked set of filters with the first filter or filters being partially transparent. This may also take the form of a semi-transparent mirror or a light splitting mechanism, or a combination, which functions to direct the image to at least two sensors that measure the photons (or other radiation) after the photons have travelled a different distance to each of the filters. Alternatively, or in combination with other implementations, one or more filters may be at least partially reflective, with the reflected light measured by a second filter. Advantageously, the reflective filter is either angled toward the second filter or toward an additional reflective surface that points to a second filter. Alternatively, reflective elements may be integrated into the filter where such elements point to a second filter or second reflective surface. In an embodiment, the distance between the sensors may be modified to provide optimal quality and quantity of distance data. For example, with an extremely narrow depth of field, it may be necessary to locate the sensors very close to each other in order to avoid having the light hitting the sensors being focused so differently that it becomes difficult to correlate. Similarly, with a wide depth of field, or with very distant objects, placing the sensors further apart may be desirable to gain additional depth data. In an embodiment, the distance between the sensors may be adjusted automatically, manually, or continuously based on data from the camera, the operator, or other sources.

Referring to FIG. 1, a camera assembly according to a dual sensor embodiment is shown. A camera body 102 including a housing holds a lens assembly 104 in an optical path (light cone) 115 for photographing a subject 110. It should be appreciated that the lens 104 typically includes several optical elements and bends the light cone 115 including rays 112, 114 in complex ways, but such features and effects are omitted from FIG. 1 for illustrative simplicity. Similarly, typical complexities of camera bodies are also omitted from the diagram.

A transmissive (e.g., semi-transparent) first sensor 106 and non-transmissive second sensor 108 may be placed in line with the path (light cone) 115 that light follows from the subject 110 through the lens 104, so that a sufficient amount of light is measured at the first sensor 106, and a sufficient amount of light to measure at the second sensor 108 passes through the first sensor 106 to the second sensor 108, where it is measured. Groups of photons reflected from areas on the subject 110 that are sufficiently similarly situated so as to be indistinguishably distant from each other given the resolving limitations of the optics in the lens 104 or the sensors 106, 108 follow what are, for practical purposes, identical paths. Two illustrative photon paths or rays 112, 114 are shown. It should be understood that multiple photons may be reflected or emitted simultaneously from indistinguishably close areas on the subject 110 and that the shutter or camera sensor discharge function will almost certainly be too slow to prevent multiple photons from being reflected at different times from the same location. Light from a photon path 112 passes through the lens 104 where it is focused onto the sensors 106, 108. The lens 104 may be configured to achieve desired focus on one of the sensors 106, 108, which may be considered the primary sensor. To achieve sharp focus on both sensors 106, 108, which may require a narrowing of the aperture in the lens 104, one or more additional sensors (not shown) may be added so that the focal point is set to a sensor located between at least two other sensors 106, 108.

When the camera is configured properly for the photograph, data is received from the sensors 106, 108 and provided to one or more processors 116. The one or more processors 116 may generate image data and metadata as described herein, and store the image data and metadata in a memory 118. Using the ray 112 as an example, the photons have travelled along a path 112 through the lens 104 which focuses them onto one of the sensors 106, 108 or other focal plane. Some of the photons are measured at the first sensor 106 and are recorded at a first interception point 120, while others pass through the first sensor 106 to the second sensor 108 and are measured at a second interception point 122. While in an embodiment the camera apparatus may avoid additional optical manipulation of the photons between the sensors, such manipulation may be necessary or desirable for various reasons, for example to filter out certain spectrum portions or to artificially create a similar photon path as may exist with greater or lesser than actual distance between the sensors.

By comparing the qualities of the light measured at each of the plurality of sensors and correlating the light measured at each of the sensors to determine which pixels on each sensor are receiving light reflected from the same object in the field of view, one element of the technology is to enhance the focus or other qualities of the photograph. Using the diagram, the light reflected from a single point on an object along photon path 112 falls on one intercept point 120 on the first sensor 106 and another intercept point 122 on the second sensor 108. Software may be used to measure the contrast between adjacent pixels, the intensity, white point, color, and/or wavelength of the light on the pixel, any or all of which may be used in conjunction with analysis of light measured on other areas of the sensors. In this way, it can be determined that the light falling on each of the intercept points 120, 122 originated at the same source. By comparing the locations of the intercept points 120, 122, advantageously also with the distance data (generated as set forth herein), it is possible to determine the path 112 that the light traveled to reach the sensors by ray tracing.

Further, by comparing the light qualities at the intercept points 120, 122 and surrounding pixels, advantageously in light of aperture and focal point, and focal length data, the technology may include comparing the relative sharpness of the focus in light of the predicted sharpness of focus for objects at various distances in order to determine distance of the object reflecting the light. For example, if the first sensor 106 intercept point 120 shows a black line four pixels wide with sharp margins surrounded by white, but the second sensor 108 intercept point 122 shows a black line 4 pixels wide, a gray margin 2 pixels wide, and then a white surrounding area, the portion of the subject 110 represented by the light traveling along the photon path 112 is in focus at the first sensor's intercept point 120 but out of focus by a measurable amount at the second sensor's intercept point 122. Because the sensors are located at different distances along the photon path 112, the one or more processors 116 can work backwards from the focus data to determine distance to the subject 110.

Another implementation may include utilizing the different focal data for the various intercept points reflecting light falling along each of the photon paths in order to permit more accurate noise reduction (for example, by removal of noise that appears only on one of the plurality of sensors) or to permit more accurate post-image-capture focus enhancement. In one implementation, the amount of blurring that is caused by an increase in the focal length by the distance between two sensors 106, 108 can be utilized to differentiate between an actual object in the photograph (which should not be enhanced or sharpened) and a focal blur artifact, which should be. The amount of sharpening should advantageously be altered for various areas in the photograph to match the amount of focal blur artifact detected in each area.

The present technology includes utilizing the depth data, however gathered, to enhance or facilitate digital reconstruction of the image as it may have looked if captured by two separate cameras (for example, a 3D camera with two lenses set apart by a similar distance to human eyes). Some alternative embodiments may include providing two or more imaging sensors and utilizing the data from the additional sensor or sensors to generate the image from the second position. The second sensor(s) need not have the same resolution, color range, light sensitivity or other qualities; in such a case, data from at least the primary sensor can be utilized to enhance the data from the secondary sensor.

In another variant, a plurality of sensors may be intentionally utilized with differing characteristics (either in terms of sensor limitations or the settings used for the sensor for that image). For example, a 3D camera with right and left lenses and corresponding right and left sensors may have the right sensor set to high light sensitivity (and thus high noise artifacts) and the left sensor set to low light sensitivity (and thus low noise artifacts). The data from each sensor may be used to enhance the data from the other, for example by identifying and removing artifacts present in one but not the other, adding back color data to the low light sensitivity image but present in the higher light sensitivity image, or similar functions. This is particularly useful in generating HDR, or high dynamic range photographs. A variant useful in some situations, and which provides a larger advantage over simply processing the same raw data from a single sensor multiple times, is to vary the aperture and/or shutter speed between the two photographs. While the resulting image may need to be corrected to create or remove focal or motion blur to match the two images, it may benefit from delivering different amounts of light to each sensor. The sensors and lenses may also be different sizes, so that a smaller lens pointing to a smaller first sensor, optionally with the same number of pixels as the larger lens pointing to the larger second sensor, will naturally deliver more similar focal and speed characteristics than attempting to use optics and speed to deliver the same image to identically sized sensors.

The foregoing examples and details may be embodied in one or more methodologies performed by a digital camera including an image sensor, processor and memory. Methodologies that may be implemented in accordance with the disclosed subject matter will be better appreciated with reference to various flow charts, summarizing more detailed aspects of the methodologies described above. Although methodologies are shown and described as a series of acts/blocks for simplicity of illustration, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored as encoded instructions and/or data on an article of manufacture, for example, a non-transitory computer-readable medium, to facilitate storing, transporting and transferring such methodologies to various devices. Those skilled in the art will understand and appreciate that a method may alternatively be represented as a series of interrelated states or events, such as in a state diagram.

As shown in FIG. 2, a camera may be used to perform a method 200 for simulating a large aperture lens. The method 200 may include capturing a photographic image data of a scene using a camera having a lens set to a first aperture size. At 204, concurrently with capturing the image, the camera may capture photogrammetric range data pertaining to depth of objects in a field of view of the camera. As used herein, "concurrently" means simultaneously, or within a time window that is small enough to minimize uncontrolled changes in the photographed scene (for example, less than one 1 millisecond for still photographs, or less for action photographs).

Various techniques for capturing photogrammetric range data are described in the foregoing detailed description, and summarized below in connection with FIGS. 3-9. A processor in the camera, or a remote processor, may perform the element 206 of processing the photographic image data using the photogrammetric range data to obtain second photographic data simulating an image captured using a lens set to a second aperture size, wherein the second aperture size is wider than the first aperture size. Various processing algorithms for processing the image data using the range data to obtain the second photographic data are described in the detailed description above. The processor may further perform the operation 208 of storing the photographic image data (e.g., a digital photo) associated with the measurement data in an electronic memory.

With reference to FIGS. 3-9, several additional operations 300-900 are summarized for capturing photogrammetric range data, which may be performed by the camera apparatus, alone or in cooperation with one or more auxiliary sensor or device. One or more of operations 300-900 may optionally be performed as part of method 200. The elements 300-900 may be performed in any operative order, or may be encompassed by a development algorithm without requiring a particular chronological order of performance. Operations can be independently performed and are not mutually exclusive. Therefore any one of such operations may be performed regardless of whether another downstream or upstream operation is performed. For example, if the method 200 includes at least one of the operations 300-900, then the method 200 may terminate after the at least one operation, without necessarily having to include any subsequent downstream operation(s) that may be illustrated.

In an aspect, the method 200 may include the additional operations 300 for capturing photogrammetric range data, as shown in FIG. 3. The method 200 may include, at 302, illuminating the scene using a narrow-band light adjacent to the lens, and measuring intensity of narrowband light reflected from objects in the scene. The method may further include, at 304, illuminating the scene with multiple narrow-band lights spaced at different frequency bands, and measuring intensity of reflected light for each frequency band.

In an aspect, the method 200 may include the additional operation 400 for capturing photogrammetric range data, as shown in FIG. 4. The method 200 may include, at 400, using at least one additional image-capturing component coupled to the camera to capture stereo photogrammetric data. For example, a specialized flash unit and/or narrow-band emitter may be coupled to the camera to generate a range-finding signal.

In connection with using a range-finding signal, the method 200 may include the additional operation 500 for capturing photogrammetric range data, as shown in FIG. 5. The method 200 may include, at 500, measuring time between emission of a signal from the camera and detection of a signal reflection at the camera. The signal reflection may be identified by being of a particular narrow-band frequency that is not generally present in the lighting environment, including, for example an ultraviolet, infrared, high-frequency sound, or other reflection.

Figure 6:
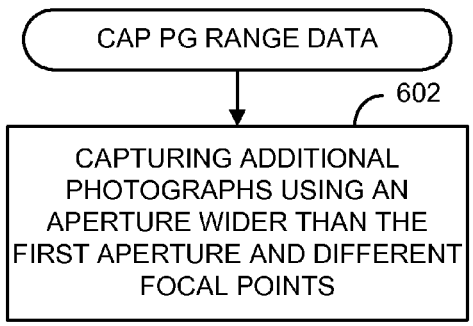

In an aspect, the method 200 may include the additional operation 600 for capturing photogrammetric range data, as shown in FIG. 6. The method 200 may include, capturing additional photographs using an aperture wider than the first aperture and different focal points. The photographs may be captured in very rapid succession so as to minimize changes due to movement of the subject or changes in the lighting environment. If the operation 500 is used, this may require a wider-aperture lens and negate the advantages of using a small-aperture lens. However, the benefits of adjusting a focal point in post-processing anytime after an image is copied are retained.

Figure 7:
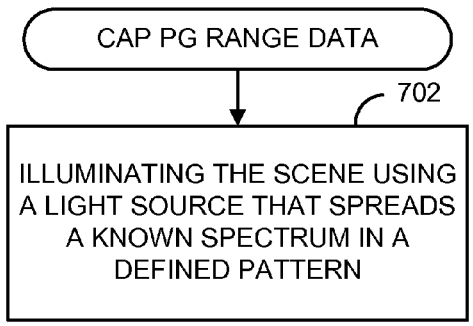

In another alternative, the method 200 may include the additional operation 700 for capturing photogrammetric range data, as shown in FIG. 7. The method 200 may include, at 700, illuminating the scene using a light source that spreads a known spectrum in a defined pattern. For example, a light source with a prism might emit light from 350 nm to 399 nm, but the prism, and in some implementations a focusing device, may deliver the light in a fixed pattern so that the light is spread in a predictable way across the field. Further details are provided in the detailed description above.

Figure 8:
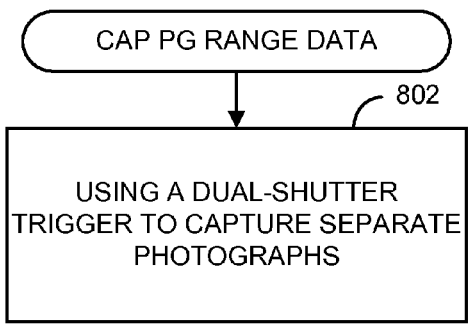

In another alternative, the method 200 may include the additional operation 800 for capturing photogrammetric range data, as shown in FIG. 8. The method 200 may include using a dual shutter trigger to capture separate photographs. In this technique, the shutter triggers once for the actual photograph and immediately before or after for a photograph reserved for measuring distance. Optionally, a low pass or other filter may be deployed for one or both exposures. Further details are provided in the description above.

Figure 9:
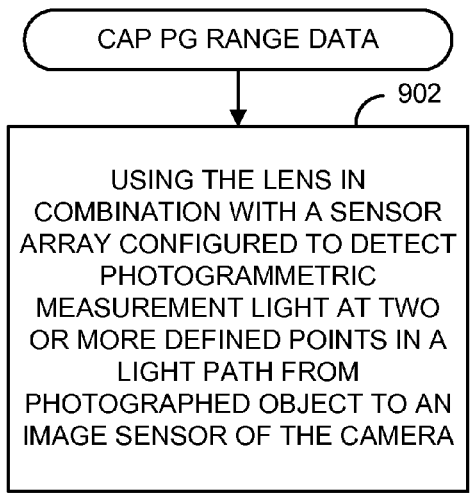

In an aspect, the method 200 may include the additional operation 900 for capturing photogrammetric range data, as shown in FIG. 9. The method may include, at 900, using the lens in combination with a sensor array configured to detect photogrammetric measurement light at two or more defined points in a light path from photographed object to an image sensor of the camera. This may include the use of dual image sensors, for example as described above in connection with FIG. 1. Alternative sensor arrangements for detecting photogrammetric measurement light used for range finding may also be used.

With reference to FIG. 10, there is provided an exemplary apparatus 1000 that may be configured as digital camera, for capturing image data in a manner enabling post-processing to simulate a large aperture lens. The apparatus 1000 may include functional blocks that can represent functions implemented by a processor, software, or combination thereof (e.g., firmware).

As illustrated, in one embodiment, the apparatus 1000 may include an electrical component or means 1014 for capturing a photographic image data of a scene using a camera having a lens set to a first aperture size, coupled with or embodied in a memory 1004. For example, the electrical component or means 1002 may include at least one control processor 1002 coupled to a memory component 1004. The control processor may operate an algorithm, which may be held as program instructions in the memory component. The algorithm may include, for example, focusing a lens mechanism, recording an aperture setting, triggering operation of a shutter mechanism, and recording data from an image sensor.

The apparatus 1000 may further include an electrical component or module 1016 for, concurrently with capturing the image, capturing photogrammetric range data pertaining to depth of objects in a field of view of the camera. For example, the electrical component or means 1016 may include at least one control processor 1002 coupled to the memory component 1004. The control processor may operate an algorithm, which may be held as program instructions in the memory component. The algorithm may include, for example, any of the more detailed algorithms summarized in connection with FIGS. 3-9, or described elsewhere herein.

The apparatus 1000 may further include an electrical component or module 1016 for processing the photographic image data using the photogrammetric range data to obtain second photographic data simulating an image captured using a lens set to a second aperture size, wherein the second aperture size is wider than the first aperture size. For example, the electrical component or means 1016 may include at least one control processor 1002 coupled to the memory component 1004. The control processor may operate an algorithm, which may be held as program instructions in the memory component. The algorithm may include, for example, tracing light rays measured by an apparatus as shown in FIG. 1 to determine how the image should appear for one or more focus points, if the image had been collected via a wider aperture lens, thereby adding bokeh not present in the original image. In an alternative, bokeh may be added to an image gathered using a small aperture lens, for example, by defining a focal plane based on a based on virtual camera setting (e.g., including aperture size), determining which pixels are in the focal plane, and blurring pixels that are out of the focal plane in an amount proportional to the distance from the focal plane. This may simulate bokeh without requiring sophisticated ray tracing, which may be too computationally intensive.

The apparatus 1000 may include similar electrical components for performing any or all of the additional operations 300-900 described in connection with FIGS. 3-9, which for illustrative simplicity are not shown in FIG. 10.

In related aspects, the apparatus 1000 may optionally include a processor component 1002 having at least one processor, in the case of the apparatus 1000 configured as a video processing apparatus, alone or in combination with a client device. The processor 1002, in such case may be in operative communication with the components 1014-1018 or similar components via a bus 1012 or similar communication coupling. The processor 1002 may effect initiation and scheduling of the processes or functions performed by electrical components 1014-1018.

In further related aspects, the apparatus 1000 may include sensor component 1006 for measuring photogrammetric range information or an image collected using a small aperture lens. The apparatus may include an input-output device 1008, for example, a touchscreen or keypad for receiving user input and displaying a user interface and captured photographs. The apparatus 1000 may optionally include a separate component for storing images, such as, for example, a memory card, non-transitory computer-readable medium or other non-volatile data storage component 1010. The computer readable medium or the memory component 1010 may be operatively coupled to the other components of the apparatus 1000 via the bus 1012 or the like. The memory components 1004 and/or 1010 may be adapted to store computer readable instructions and data for implementing the processes and behavior of the components 1014-1018, and subcomponents thereof, or the processor 1002, or the methods disclosed herein. The memory components 1004 and/or 1010 may retain instructions for executing functions associated with the components 1014-1018. While shown as being internal to the memory 1004, it is to be understood that the components 1014-1018 can exist external to the memory 1004. The apparatus may include other components commonly included in digital cameras or other electronic devices (e.g., smartphones, notepad computers, etc.) that include a camera function.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In one or more exemplary designs, the functions described may be implemented in hardware, software, firmware, or any combination thereof. If implemented in software, the functions may be stored on or transmitted over as one or more instructions or code on a non-transitory computer-readable medium. Computer-readable media may includes both computer storage media and non-transitory communication media including any medium that facilitates transfer of a computer program from one place to another. A storage media may be any available media that can be accessed by a general purpose or special purpose computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor.

The previous description of the disclosed embodiments is provided to enable any person skilled in the art to make or use the embodiments disclosed. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method, comprising:
    capturing a photographic image data of a scene using a camera having a lens set to a first aperture size;
    concurrently with capturing the image, capturing photogrammetric range data pertaining to depth of objects in a field of view of the camera, comprising illuminating the scene using multiple narrow-band lights spaced at different frequency bands including at least one narrow-band light adjacent to the lens, and measuring intensity of narrowband light reflected from objects in the scene for each frequency band; and
    processing the photographic image data using the photogrammetric range data to obtain second photographic data simulating an image captured using a lens set to a second aperture size, wherein the second aperture size is wider than the first aperture size.

2. The method of claim 1, further comprising storing the photographic image data associated with the measurement data in an electronic memory.

3. The method of claim 1, wherein capturing the photogrammetric range data further comprises using at least one additional image-capturing component coupled to the camera to capture stereo photogrammetric data.

4. The method of claim 1, wherein capturing the photogrammetric range data further comprises measuring time between emission of a signal from the camera and detection of a signal reflection at the camera.

5. The method of claim 1, wherein capturing the photogrammetric range data further comprises capturing additional photographs using an aperture wider than the first aperture and different focal points.

6. The method of claim 1, wherein capturing the photogrammetric range data further comprises illuminating the scene using a light source that spreads a known spectrum in a defined pattern.

7. The method of claim 1, wherein capturing the photogrammetric range data further comprises using a dual shutter trigger to capture separate photographs.

8. The method of claim 1, wherein capturing the photogrammetric range data further comprises using the lens in combination with a sensor array configured to detect photogrammetric measurement light at two or more defined points in a light path from photographed object to an image sensor of the camera.

9. A camera apparatus comprising a processor and a memory coupled to the processor; wherein the memory holds program instructions, that when executed by the processor, causes the apparatus to perform:
  capturing a photographic image data of a scene using a camera having a lens set to a first aperture size;
  concurrently with capturing the image, capturing photogrammetric range data pertaining to depth of objects in a field of view of the camera, including illuminating the scene using multiple narrow-band lights spaced at different frequency bands including at least one narrow-band light adjacent to the lens, and measuring intensity of narrowband light reflected from objects in the scene for each frequency band; and
  processing the photographic image data using the photogrammetric range data to obtain second photographic data simulating an image captured using a lens set to a second aperture size, wherein the second aperture size is wider than the first aperture size.

10. The apparatus of claim 9, wherein the program instructions are further configured for storing the photographic image data associated with the measurement data in an electronic memory.

11. The apparatus of claim 9, wherein the program instructions are further configured for capturing the photogrammetric range data by using at least one additional image-capturing component coupled to the camera to capture stereo photogrammetric data.

12. The apparatus of claim 9, wherein the program instructions are further configured for capturing the photogrammetric range data by measuring time between emission of a signal from the camera and detection of a signal reflection at the camera.

13. The apparatus of claim 9, wherein the program instructions are further configured for capturing the photogrammetric range data by capturing additional photographs using an aperture wider than the first aperture and different focal points.

14. The apparatus of claim 9, wherein the program instructions are further configured for capturing the photogrammetric range data by illuminating the scene using a light source that spreads a known spectrum in a defined pattern.

15. The apparatus of claim 9, wherein the program instructions are further configured for capturing the photogrammetric range data by using a dual shutter trigger to capture separate photographs.

16. The apparatus of claim 9, wherein the program instructions are further configured for capturing the photogrammetric range data by using the lens in combination with a sensor array configured to detect photogrammetric measurement light at two or more defined points in a light path from photographed object to an image sensor of the camera.

* * * * *